March 30, 1965     E. L. SCHEIDENHELM     3,175,347

TINE MOUNTING

Filed May 9, 1963     2 Sheets-Sheet 1

INVENTOR.
EARL L. SCHEIDENHELM
BY *Walles & St.John*
ATTYS.

March 30, 1965 — E. L. SCHEIDENHELM — 3,175,347
TINE MOUNTING
Filed May 9, 1963 — 2 Sheets-Sheet 2
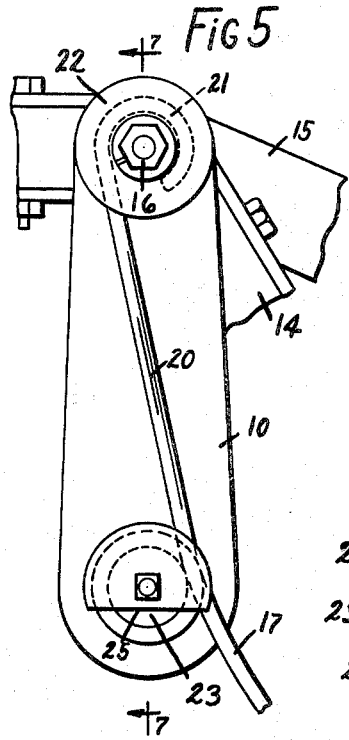
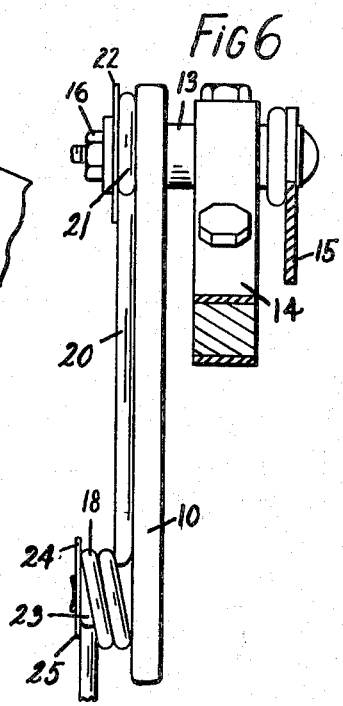
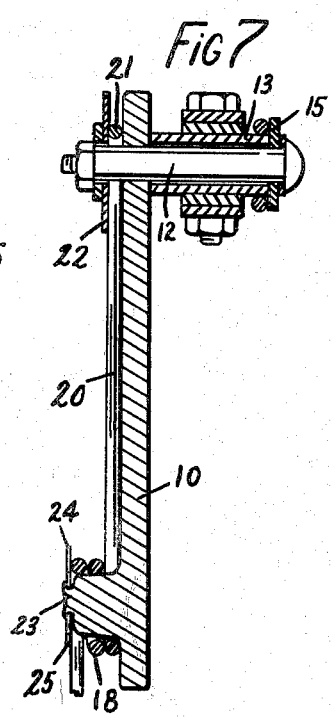
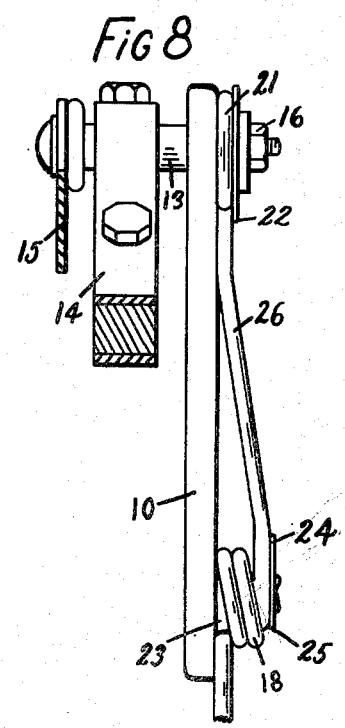
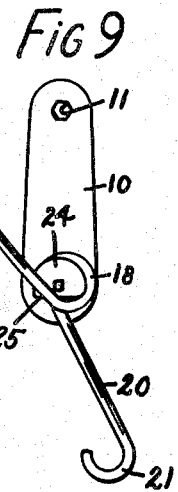
INVENTOR.
EARL L. SCHEIDENHELM
ATTYS.

United States Patent Office

3,175,347
Patented Mar. 30, 1965

3,175,347
TINE MOUNTING
Earl L. Scheidenhelm, Mendota, Ill., assignor, by mesne assignments, to Hart-Carter Company, Chicago, Ill., a corporation of Delaware
Filed May 9, 1963, Ser. No. 279,210
4 Claims. (Cl. 56—400)

This invention relates to a novel tine mounting, particularly designed for the mounting of outside tines of a harvester reel.

Harvester reels for crop engaging implements often utilize outside mounting arms in the form of polygons which stabilize the angular position of the reel bats relative to the machine on which the reel is mounted. The polygon is normally protected from entanglement with the crop by the provision of a single row of outer tines which straighten the crop at the ends of the reel and keep it moving past the dividing boards at the ends of the cutting mechanism. A full description of the operation of the outer tines can be obtained by reference to United States Patent No. 2,795,921, issued on June 18, 1957, to Horace D. Hume.

A constant problem with the outer tines is the tendency of the tines to bend outwardly parallel to the reel bats. This causes entanglement of the tines with the supporting apparatus of the reel, and resultant damage to the tine or other portions of the machine. Another problem is that failure in the tine often results in the metal tine being dropped into the cutting mechanism, thereby damaging the cutting edges of the machine.

A first object of this invention is to provide a novel tine mounting which will positively retain the tine coil from moving outwardly relative to the reel. This is accomplished by provision of a fixed abutment on the tine at each side of the tine coil.

Another object of this invention is to provide a smooth round surface for contact with the inner surface of the tine coil to thereby reduce localized stress areas, which in the past have caused coil breakage.

Another object of the invention is to prevent the dropping of the tine finger into the crop being harvested should the tine fail in any section above the coil.

The final object of this invention is to provide a positive tine mounting which will not allow the tine to be removed from the bracket without a serious attempt being effected. As an adjunct to this object, simple means are provided by which a tine can be removed when this is necessary.

These and further objects will be evident from a study of the following disclosure taken in conjunction with the accompanying drawings which illustrate the invention as utilized at each end of the reel. It is to be emphasized that the exemplary structure of the drawings is not intended to restrict or confine the scope of the invention except as the invention is set out in the claims which follow.

In the drawings:

FIGURE 5 is a fragmentary side view of the outer tine assembly as mounted on a reel;

FIGURE 6 is a side view of the assembly as seen in FIGURE 5;

FIGURE 7 is a sectional view taken along line 7—7 in FIGURE 5;

FIGURE 8 is a view similar to FIGURE 6 showing the opposite end of the reel; and FIGURE 9 is a reduced view of the tine and bracket, showing the removal or assembly of a tine on the bracket.

Figure 1:
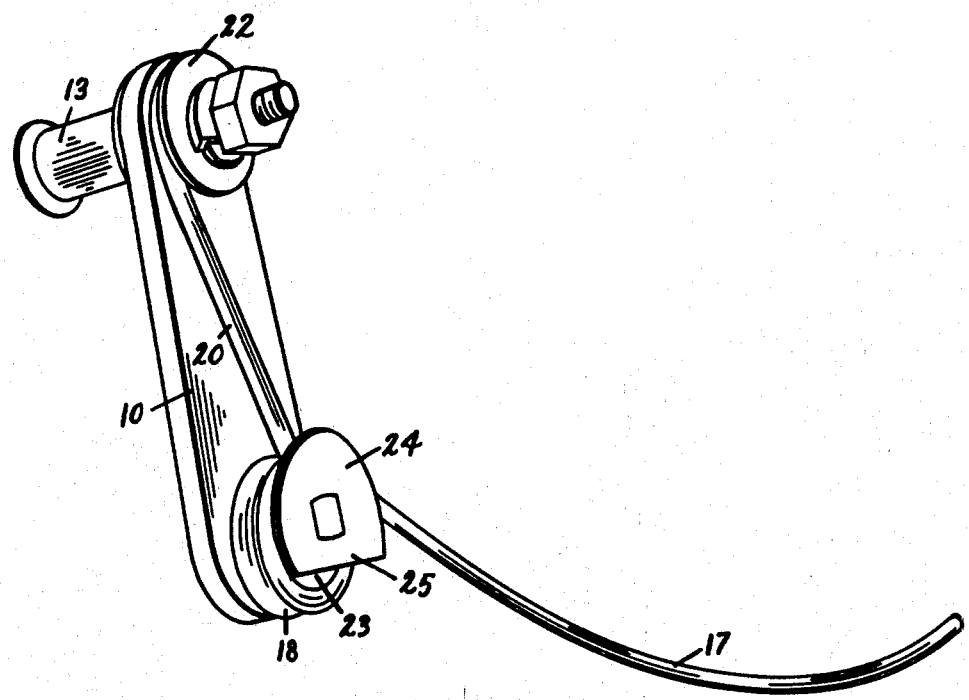
FIGURE 1 is a perspective view of the outer tine assembly as constructed according to this invention.
Figure 2:
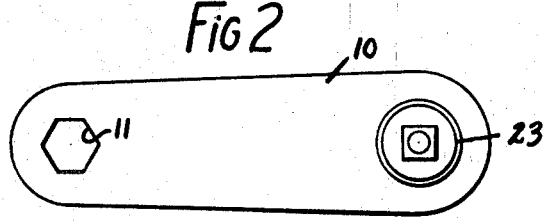
FIGURE 2 is a top view of the tine bracket removed from the reel with the cap not yet assembled thereon.
Figure 3:
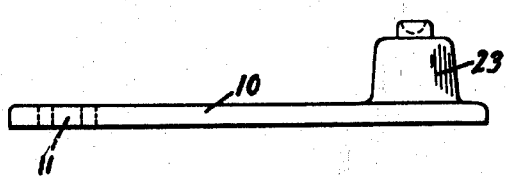
FIGURE 3 is a side view of the bracket seen in FIGURE 2.
Figure 4:
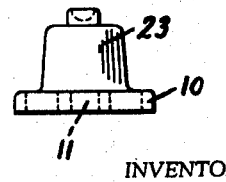
FIGURE 4 is an end view taken from the right hand end of FIGURE 3.

The basic structure of this invention is clearly shown in the drawings. The tine bracket comprises a bar or strap 10 which is provided with a polygonal aperture 11 adapted to receive a complementary polygonal bolt shaft 12. The bolt shaft 12 is rotatably carried by a collar 13 received within a suitable aperture in a reel polygon 14. The polygonal bolt shaft 12 is also received within a crank arm 15 which connects the shaft 12 to the main portion of the harvester reel (not shown). Thus the angular position of the bar 10 will be controlled by the angular position of the crank arm 15. The entire assembly is capped by an outside nut 16 on the outer threaded portion of the bolt shaft 12.

The present invention contemplates the use of a finger tine having a lower portion 17, a coil 18 and an upper portion 20 culminating in a hooked configuration 21. The hooked configuration 21 is adapted to be clamped between the bar 10 and enlarged washer 22 by means of the nut 16. The novel feature of this tine mounting is the manner by which the coil 18 is restrained from outward movement relative to the bar 10.

This object of retaining the coil 18 parallel to the reel bats is effected by means of a projection 23, fixed to the bar 20, and extending outwardly therefrom at a position so as to receive the coil 18. The projection 23 may be welded or cast with the bar 10 or may be a separate element fixed thereto in any suitable way. The outside diameter of the projection 23 should be such that it is slightly less than the inside diameter of the coil 18. Thus, relatively little movement will be allowed between the projection 23 and the coil 18.

Fixed to the projection 23 is a cap 24 which has an outside circular shape having a diameter greater than the outside diameter of the coil 18 and interrupted by a flat edge 25. Edge 25 is spaced outwardly from the center of cap 24 by a maximum distance less than the radius of cap 24. The purpose of edge 25 is to allow one to spring the lower portion 17 of the tine over the cap 24 so as to threadably engage the coil 18. The tine can then be screwed onto or from the cap 24 to mount or dismount the tine. This operation is illustrated in FIGURE 9. The cap 24 may be riveted to the projection 23 as shown in the drawings, or may be fastened in any other suitable manner.

The particular tine mounting shown is symmetrical about a vertical center line and may be used at either side of the wheel. Shown in FIGURES 5, 6 and 7 is the mounting as used at the right hand end of the reel in the direction of movement thereof. In FIGURE 8 the same construction is shown as viewed from the left hand end of the reel, the only modification being a simple bent portion 26 directly above the coil 18 in the tine so as to enable the manufacturer to use the same coil winding for the tines at each end of the reel.

The present invention provides an extremely rigid retention of the tine in a direction parallel to the bats of the reel, by providing the outer plane surfaces of the bar 10 directly in abutment with the upper portion 20 of the tine and by restraining motion of the coil 18 between the bar 10 and the cap 24. The projection 23 provides a smooth round surface for contact with the inner surface of the coil 18, allowing restricted flexing of the coil 18, but reducing localized stress areas which frequently cause coil breakage. The tine is held by the cap 24 and projection 23 so that it cannot fall off if it should break above the coil 18. A very definite advantage is that the bracket prevents accidental disengagement of the tine unless a serious attempt is made to remove it from the bar 10.

Even though the tine might come loose by disengagement of the nut 16, the coil 18 will be held by the cap 24. However, removal of the tine is not difficult, and is accomplished by simply forcing the lower portion 17 of the tine over the corner formed by the edge 25 on cap 24 and threadably removing the coil 18 from engagement by cap 24.

Various modifications may present themselves to one skilled in this art after studying the above disclosure. For this reason the following claims are intended to define and restrict the scope of the invention. They do intend to include equivalent structures and alternate designs which will accomplish the same purposes in substantially the same way.

Having thus described my invention, I claim:

1. A tine retainer for the outer tine of a harvester reel comprising:
   a tine having an integral coil;
   an elongated bar having a flat surface;
   an outwardly directed projection fixed relative to said bar;
   and a cap fixed to the outer end of said projection having a generally circular configuration interrupted by an edge spaced outwardly from the center of said cap by a maximum distance less than the cap radius, whereby a coil mounted on said projection can be threadably engaged by said cap.

2. A tine retainer for the outer tine of a harvester reel comprising:
   a tine having an integral coil;
   an elongated bar having an outwardly facing flat surface;
   an outwardly directed projection extending from said surface and adapted to mount the tine coil thereon;
   and a cap fixed to the outer end of said projection having a generally circular configuration of a diameter greater than the outer diameter of a tine coil mounted thereon interrupted by an edge spaced outwardly from the center of said cap by a maximum distance less than the cap radius, whereby a tine coil mounted on said projection can be threadably engaged on said cap.

3. A tine retainer as set out in claim 2 wherein the projection extends outwardly a distance slightly greater than the tine coil thickness.

4. A tine retainer as set out in claim 2 wherein said edge of said cap is formed along a straight line.

References Cited by the Examiner
UNITED STATES PATENTS

| | | | |
|---|---|---|---|
| 2,235,949 | 3/41 | Shaw | 24—221 X |
| 2,795,921 | 6/57 | Hume | 56—400 X |
| 2,856,748 | 10/58 | Keene | 56—400 |
| 2,994,181 | 8/61 | Scheidenhelm | 56—400 |

T. GRAHAM CRAVER, *Primary Examiner.*

RUSSELL R. KINSEY, *Examiner.*